Nov. 16, 1926.

Re. 16,478

A. C. JACOBSON

SAWING MACHINE

Original Filed Nov. 2, 1922 3 Sheets-Sheet 1

INVENTOR.
Axel C. Jacobson.
BY Drury, Strong, Fairchild & Lefler
ATTORNEYS.

Nov. 16, 1926.

A. C. JACOBSON

Re. 16,478

SAWING MACHINE

Original Filed Nov. 2, 1922 3 Sheets-Sheet 2

INVENTOR.
Axel C. Jacobson.
BY Dewey, Strong, Tousley & Lightner
ATTORNEYS.

Nov. 16, 1926.

A. C. JACOBSON

Re. 16,478

SAWING MACHINE

Original Filed Nov. 2, 1922 3 Sheets-Sheet 3

INVENTOR.
Ascel C. Jacobson.
BY Dewey, Strong, Tunnicliff & Loftus
ATTORNEYS.

Reissued Nov. 16, 1926.

Re. 16,478

UNITED STATES PATENT OFFICE.

AXCEL C. JACOBSON, OF SAN FRANCISCO, CALIFORNIA, ASSIGNOR TO MONARCH ELECTRIC SAW COMPANY, OF SAN FRANCISCO, CALIFORNIA, A CORPORATION.

SAWING MACHINE.

Original No. 1,488,678, dated April 1, 1924, Serial No. 598,576, filed November 2, 1922. Application for reissue filed January 18, 1926. Serial No. 82,124.

The hereinafter described invention relates to that class of sawing mechanism wherein a circular saw is rotated in adjustably suspended condition to conveniently contact the object to be sawed, being of the type upon which United States Letters Patent No. 1,312,964 of August 12, 1919, entitled "Sawing machine" was granted to Fred M. Easton. The primary object of the present invention is to provide a sawing mechanism of this type embodying improvements rendering the mechanism more efficient and convenient in operation and of less danger to the operator.

In my improved machine, the saw is so mounted on a pivoted arm as to be freely movable fore and aft, laterally and vertically, and among the objects of the present invention is to so counter-balance the arm that the saw can be held and guided by the operator with the least possible effort and the arm easily and quickly moved in a manner raising the saw to a remote retired position out of danger to the operator and held in such position.

Another object of my invention is the provision of improved controlling means so combined with the mechanism that the power to drive the saw is automatically disconnected when the saw moves to the said retired position and is automatically connected to drive the saw when the saw is moved therefrom toward the working position. By means of this automatic control, the saw has gained the necessary momentum or speed to assure expeditious and efficient cutting by the time it is brought against the work. Difficulty has heretofore been encountered in this respect in manually controlled saws of the type shown in the said Easton patent, since the operator frequently fails to start the saw in time.

Another object of the invention is to provide an electrical mechanism operable through the pivotal saw supporting lever arm for automatically controlling the operation of the electric motor used in driving the saw so that when the pivotal arm is confined against movement the electrical circuit to the motor will be closed, thereby effecting simple and efficient mechanism and control for the operator, and eliminating the necessity of having to carry the electrical connections on to the pivotal arm in operating the switch thereon to start the saw in motion as heretofore.

Another object of the invention is to provide latch means for holding the saw-carrying arm in the said retired position and co-operating means operable from a point adjacent the handle on the arm, and preferably connected to the handle itself, for releasing the latch to permit moving the saw to working position.

A further object of the invention is to improve the mounting of the saw-carrying carriage by providing the carriage with grooved rollers co-operating with a horizontal track round in cross section, such construction permitting free rolling movement of the carriage along the track and free transverse swinging movement thereon.

In the accompanying drawings I have illustrated certain specific embodiments of my invention, but it will be understood that the invention can be otherwise embodied and that the drawings are not to be construed as defining or limiting the scope of the invention, the claims appended hereto being relied upon for that purpose.

Referring to the figures of the drawing Fig. 1 is a side elevation of the fully assembled mechanism with the pivotal arm confined out of movement in which position the electric current is disconnected and the saw is at rest.

Figure 1:
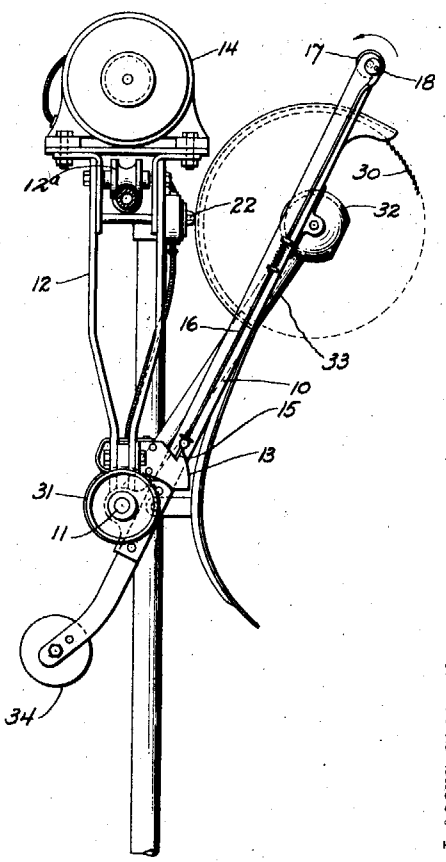

Referring to the drawings, numeral 10 designates the pivotal saw carrying member rotatable on the shaft 11, the latter being journalled at the end of a yoke or member 12. This yoke is supported on a pair of grooved rollers 12[a] travelling on a round track 12[b]. The lower end of yoke 12 is provided with a notched quadrant 13 while bracketed to its opposite end is electric motor 14. My invention contemplates the pivotal mounting of the saw-carrying member 10 to move to and between a retired position (Fig. 1) and a working position (Fig. 2) and means for holding the member in the retired position. As one convenient means which may be used for holding the member in this position, I illustrate herein a latch hereinafter described.

Releasably confined to the pivotal member 10, through engagement with the notch 15 of quadrant 13, is rod or pin 16 constructed in the present instance to be lifted out of engagement therewith by rotary movement of the handle 17 to which the rod 16 is attached through a crank pin 18. Upon disengagement of the rod 16 from the notch 15 the pivotal member 10 is free to move on shaft 11 at the will of the operator. Located closely adjacent quadrant 13 is switch 19 with electrical connections leading to motor 14. Switch 19 is provided with a push button 20 against which spring 21 is caused to bear so that a closed circuit is normally made through switch 19 to motor 14.

Pivotal member 10 is so arranged in relation to push button 20 that upon engagement of the rod 16 in notch 15 it is brought to bear against push button 20 pushing the same back against the spring 21 and opening the electric circuit through the switch 19, thereby shutting off the motor 14. A hand switch 22 is also provided for opening and closing the electric circuit from the power source but the control of the motor 14 in the operation of the saw is ordinarily automatically effected entirely through switch 19.

The shaft 11 which serves as a pivotal bearing for the member 10, is rotated by motor 14 through belt drive 23, although any equivalent drive may be used. Affixed to shaft 11 is bevel gear 24 and meshed therewith is bevel gear 25. To the end of bevel gear 25 is secured an extended shaft 26 and to the opposite end of shaft 26 is affixed bevel gear 27. Meshing with bevel gear 27 is bevel gear 28 carried by shaft 29, the latter being journalled in the end of pivotal member 10, and secured directly on shaft 29 is saw 30. The housing 31 completely encases the bevel gears 24 and 25 on shaft 11 while the housing 32 entirely encloses the bevel gears 27 and 28. The extended shaft 26 between the bevel gears is fully enclosed in housing 33 which also serves as a bearing for same. A counterweight 34 is secured to the end of member 10 beyond the pivotal shaft 11 so as to facilitate the movement of the saw in operation without undue exertion on the part of the operator and to render the movement of the saw to the remote and inoperative position an easy and quick operation.

Figure 3:
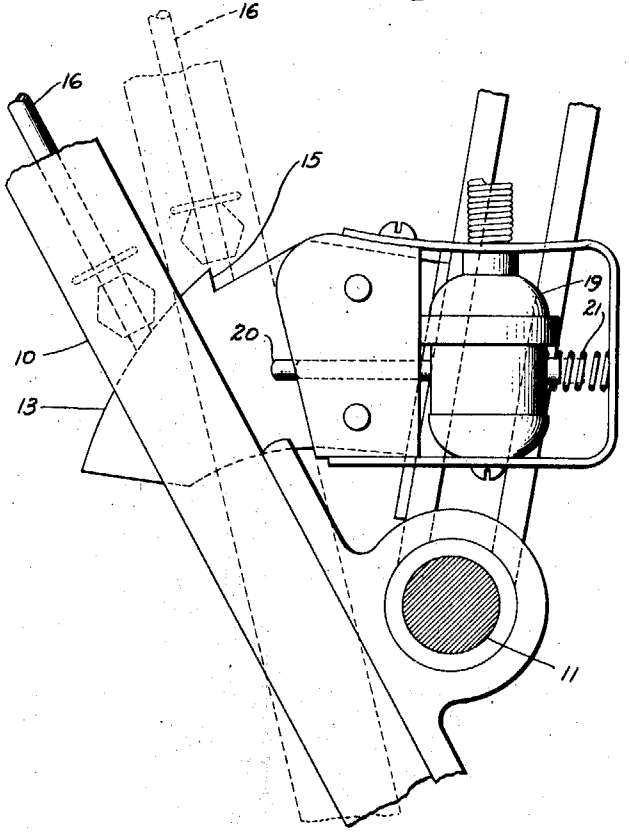
Fig. 3 is an enlarged side elevation partly in section showing the breaking of the electrical connection in the switch upon securement of the pivotal arm (shown in dotted lines) and the making of the electrical connection through the switch upon movement of the pivotal arm, (shown in solid lines) the latter operation setting the saw in motion.
Figure 4:
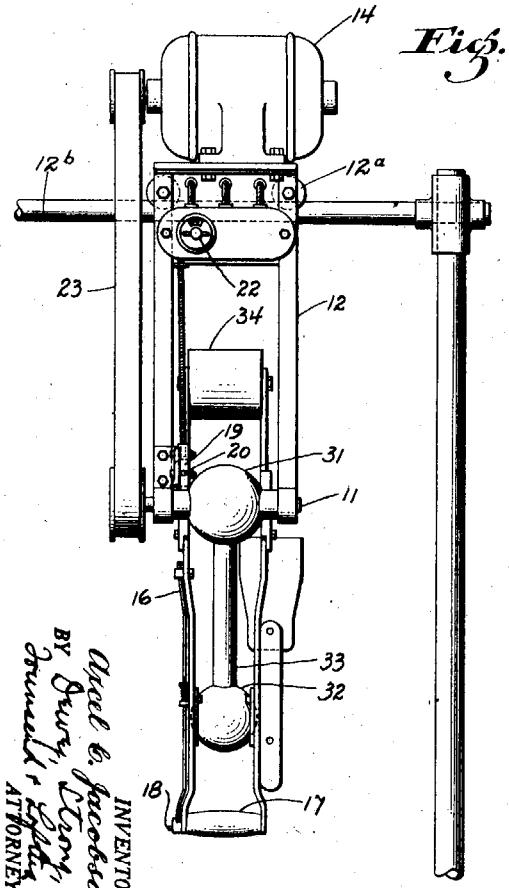
Fig. 4 is a completely assembled front view of the device with the pivotal arm down to show the complete housing of the transmission carried by same.
Figure 6:
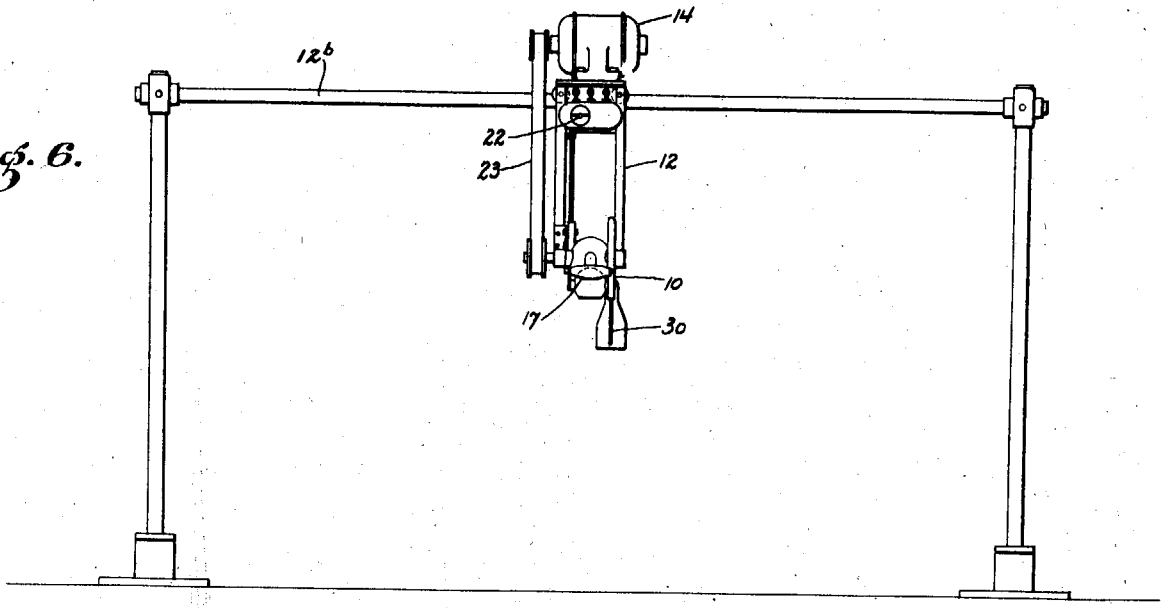
Fig. 6 is a completely assembled view showing the machine as mounted in practical operation, the pivotal arm being down and the saw running.
Figure 5:
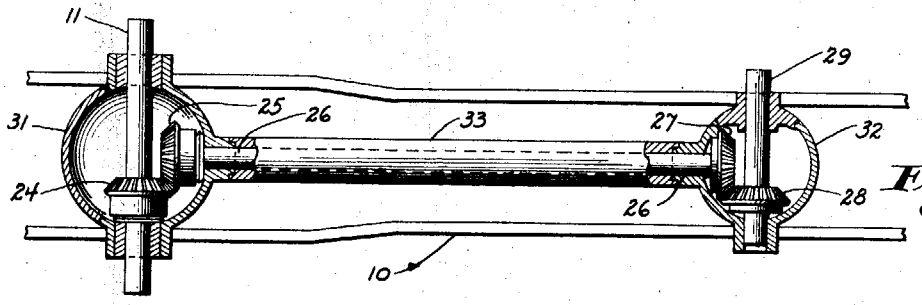
Fig. 5 is an enlarged sectional view of the transmission shown as a bevel gear drive fully encased or housed.

The device completely assembled is mounted on a supporting frame as shown in Fig. 6, which in the present instance is made of shafting with flanged floor supports, although angle iron or structural shapes may be used equally satisfactory as a supporting frame upon which the saw may travel. It will also be noted that the push button switch 19 is securely bracketed to the yoke 12 and the electrical wires leading into the switch are covered with a helical wire spring to protect them. When the switch is opened and the motor 14 is stopped, the member 10 is held in fixed position by the end of rod 16 engaging in the notch 15, as shown in dotted lines, Fig. 3.

The operation of my improved sawing machine is believed to be obvious. Normally the device is in the inoperative position shown in Fig. 1. In this position the member 10 engages against the push button 20 and holds the switch 19 in the open position.

The saw can be brought down to the working position by releasing the latch, this releasing means being operable from a point adjacent the handle 17 and preferably connected to the handle itself as illustrated. When the latch is released and the saw brought toward the working position shown in Fig. 2, the spring 21 closes the switch and starts the motor. By the time the saw reaches the work the motor has attained sufficient speed to efficiently perform the cutting operations. It will be obvious that in the sawing operations the yoke 12 is free to travel along the track 12[a] and the provision of the grooved rollers engaging the round track permits free rocking movement of the yoke on the track.

The swingable mounting of the yoke on the track permits fore and aft horizontal movement of the saw, the pivotal movement of the arm at 11 permits vertical movement of the saw, and the said travelling movement on the track permits lateral movement of the saw. In this manner the saw is movable to any working position desired.

The counter-balancing of the arm member 10 provides for the holding and guiding of the saw by the operator with the least possible effort, thereby rendering the machine more efficient and convenient in operation.

Figure 2:
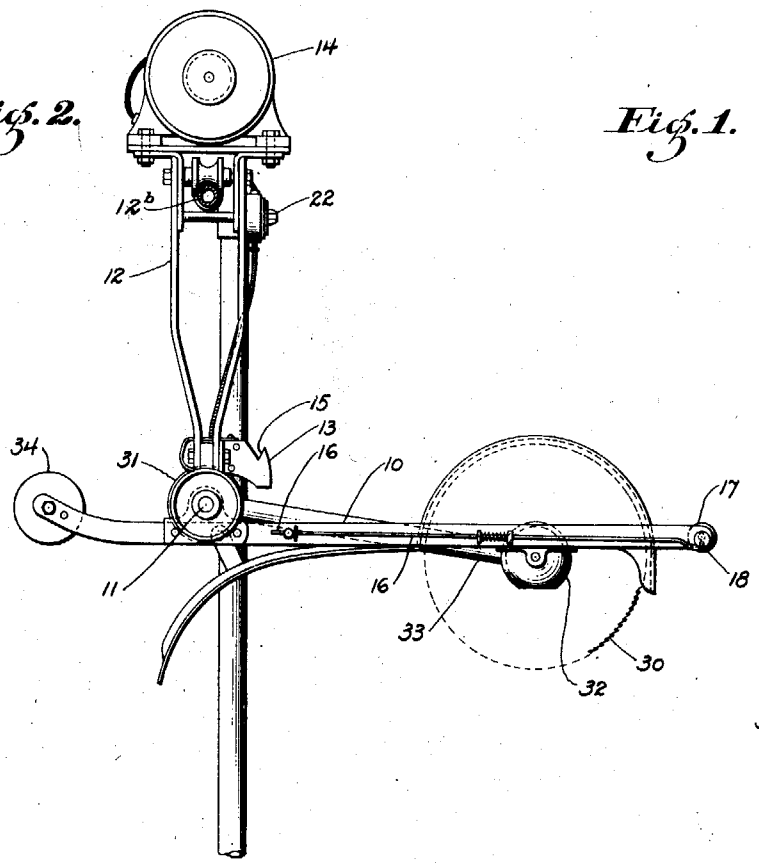
Fig. 2 is likewise a side elevation of the complete assembly in which position the saw is running, the electrical connection for starting being made immediately upon disconnecting the pivotal lever arm from the latch as shown.

Furthermore, this counter-balancing of the arm renders the moving of the saw to the retired position shown in Fig. 1 a very easy and quick operation. When the operator is through using the saw he need only give the same a slight push in the upward direction and the counter-balance acts to continue moving the same to the retired position, as illustrated in Fig. 1, where it is held by the latch at 15. It will be obvious that in this remote retired position the saw is entirely out of danger to the operator and gives him free access to the work table.

Having thus described my invention, what I claim and desire to secure by Letters Patent is:

1. A sawing machine comprising the combination of a pivotally mounted frame, a saw mounted thereon for swinging movement therewith to operative and inoperative positions, an electric motor, an operative driving connection from the motor to the saw, a normally closed switch for controlling the motor, and means carried by the frame and adapted to engage and hold the switch open when the frame is in the fully retired position.

2. A sawing machine comprising the combination of a supporting frame, an arm pivotally mounted therein for movement in a vertical plane, a saw carried by the arm at one side of the pivotal mounting, the pivotal mounting of the arm permitting the saw to be raised to a remote retired position and lowered to the working position, an electric motor, an operative driving connection from the motor to the saw, a switch carried by the frame, and means carried by the arm and co-operating with the switch in a manner causing the switch to open when the arm pivots to bring the saw to the retired position and to close when the arm is moved therefrom toward the working position.

3. A sawing machine comprising the combination of a supporting frame, an arm pivotally mounted thereon for movement in a vertical plane, a saw carried by the arm at one side of the pivotal mounting, the pivotal mounting of the arm permitting the saw to be raised to a remote retired position and lowered to the working position, a handle on the arm adjacent the saw, a power driving connection to the saw, co-operating latch means carried by the arm and frame for holding the arm in the retired position, and means operable from a point adjacent the handle for releasing the latch.

4. A sawing machine comprising the combination of a horizontal track, a downwardly extending yoke supported thereon for travelling movement along the track and for transverse swinging movement about the longitudinal axis thereof, an arm pivotally mounted on the lower end of the yoke for movement in a vertical plane, a circular saw at one end of the arm at one side of the yoke, the arm being pivotally movable to raise the saw to a remote retired position out of danger to the operator, counterbalancing means acting on the arm in a direction to raise the saw to its retired position, and power driving connections to the saw, the mounting of the yoke for swinging movement about the track axis permitting horizontal movement of the saw, the pivoted arm permitting vertical movement thereof, and the said travelling movement permitting lateral movement of the saw.

5. A sawing machine comprising the combination of a horizontal track, a downwardly extending yoke supported thereon for travelling movement along the track and for transverse swinging movement about the longitudinal axis thereof, an arm pivotally mounted on the lower end of the yoke for movement in a vertical plane, a circular saw at one end of the arm at one side of the yoke, the arm being pivotally movable to raise the saw to a remote retired position out of danger to the operator, counterbalancing means on the arm at the other side of the yoke and acting on the arm in a direction to raise the saw to its retired position, and power driving connections to the saw, the mounting of the yoke for swinging movement about the track axis permitting horizontal movement of the saw, the pivoted arm permitting vertical movement thereof, and the said travelling movement permitting lateral movement of the saw.

6. A sawing machine comprising the combination of a horizontal track, a downwardly extending yoke supported thereon for travelling movement along the track and for transverse swinging movement about the longitudinal axis thereof, an arm pivotally mounted on the lower end of the yoke for movement in a vertical plane, a circular saw at one end of the arm at one side of the yoke, the arm being pivotally movable to raise the saw to a remote retired position out of danger to the operator, means acting on the arm in a direction to raise the saw to and hold the arm in such position, and power driving connections to the saw, the mounting of the yoke for swinging movement about the track axis permitting horizontal movement of the saw, the pivoted arm permitting vertical movement thereof, and the said travelling movement permitting lateral movement of the saw.

7. A sawing machine comprising the combination of a horizontal track, a downwardly extending yoke supported thereon for travelling movement along the track and for transverse swinging movement about the longitudinal axis thereof, an arm pivotally mounted on the lower end of the yoke for movement in a vertical plane to and between a working position and a retired position, a circular saw at one end of the arm at one side of the yoke, counterbalancing means acting on the arm in a direction to raise the saw to its retired position, power driving connections to the saw, and means, including an electric switch automatically controlled by the arm, for applying the power when the arm is moved downwardly from the said retired position and for releasing the power when the arm is moved to the retired position, the mounting of the yoke for swinging movement about the track axis permitting horizontal movement of the saw, the pivoted arm permitting vertical movement thereof, and the said travelling movement permitting lateral movement of the saw.

8. A sawing machine comprising a horizontal track substantially round in cross-section, a carriage having grooved supporting rollers mounted on the track for travel lengthwise of and transverse rocking movement on the track, a frame member supported on and depending from the carriage, an arm pivotally connected to the lower end of the frame member for movement in a vertical plane, a circular saw on the outer end of the arm, driving connections to the saw, a handle on the arm adjacent the saw whereby the operator may rock the carriage to permit fore and aft movement of the saw and advance the carriage along the track to move the saw laterally, and may also raise and lower the saw through pivotal movement of the arm, the arm being pivotally movable to raise the saw to a remote retired position out of danger to the operator, and counterbalancing means acting on the arm in a direction to raise the saw to the said remote retired position.

AXCEL C. JACOBSON.